United States Patent [19]

Smarook et al.

[11] 3,919,380
[45] Nov. 11, 1975

[54] PROCESS FOR EXPANDING ANNEALED THERMOFORMABLE MATERIALS

[75] Inventors: Walter H. Smarook, Somerville; John Sonia, Clinton, both of N.J.

[73] Assignee: Union Carbide Corporation, New York, N.Y.

[22] Filed: Dec. 26, 1973

[21] Appl. No.: 427,480

Related U.S. Application Data

[63] Continuation-in-part of Ser. No. 213,432, Dec. 29, 1971, abandoned.

[52] U.S. Cl. .............. 264/164; 264/261; 264/275; 264/346; 425/110; 425/812; 428/116; 428/134; 428/137; 428/310
[51] Int. Cl.² .................... B29C 17/02; B32B 3/12
[58] Field of Search ........... 264/41, 47, 291, 210 R, 264/164, 346, 261; 425/812, 110; 65/DIG. 5, 59

[56] References Cited
UNITED STATES PATENTS

| | | | |
|---|---|---|---|
| 2,502,304 | 3/1950 | Baker | 264/41 X |
| 2,962,409 | 11/1960 | Ludlow et al. | 264/261 X |
| 3,215,583 | 11/1965 | Holme | 161/53 |
| 3,277,535 | 10/1966 | Rupert | 425/812 UX |
| 3,317,642 | 5/1967 | Bailey | 264/235 X |
| 3,367,260 | 2/1968 | Bendig et al. | 264/291 X |
| 3,555,135 | 1/1971 | Paul | 264/235 X |
| 3,708,565 | 1/1973 | Seiffert | 264/47 X |
| 3,723,224 | 3/1973 | Noguchi | 264/210 R X |

FOREIGN PATENTS OR APPLICATIONS

| | | | |
|---|---|---|---|
| 1,015,330 | 12/1965 | United Kingdom | 264/164 |
| 2,065,469 | 7/1971 | France | 264/164 |

OTHER PUBLICATIONS

Billmeyer, Fred W., "Textbook of Polymer Science," New York, Interscience, c1962, pp. 198–204.
Ritchie, P. D., Edt. "Physics of Plastics," Princeton, N.J., D. Van Nostrand, c1965, pp. 226–229, 248–255, 263–265.
Lee, Henry; Donald Stoffey, and Kris Neville, "New Linear Polymers," New York, McGraw-Hill, c1967, pp. 119–127.
Brydson, J. A., "Plastics Materials," Second Edition, New York, Van Nostrand, Reinhold, c1970, pp. 166–169, 192–197, 341–356, 570–575.
Braun, Dietrich Harold Cherdon and Werner Kern, "Techniques of Polymer Syntheses and Characterization," New York, Wiley–Interscience, c1972, pp. 24–27.
Encyclopedia of Polymer Science and Technology, Vol. 1, Sections: "Theory of Adhesive Joints" and Adhesive Compositions New York, John Wiley & Son, c1964, pp. 477–485.
Encyclopedia of Polymer Science and Technology, Vol. 2, Sections: "Annealing," New York, John Wiley & Son, c1965, pp. 138–150.
Encyclopedia of Polymer Science and Technology, Vol. 12, Section: "Sizing," New York, John Wiley & Son, c1970, pp. 585–588.
Eirich, Frederick R., Edt. "Rheology Theory and Applications," Vol. 3, New York, Academic Press, 1960, pp. 167–176, 193,481–485.
McLaren, A. D. "Adhesion of High Polymers to Cellulose Influence of Structure, Polarity and Tack Temperature," In Journal of Polymer Science, Vol. 3, No. 5 (1948), pp. 652–662.
McLaren, A. D., T. T. LI; Robert Rager and H. Mark, "Adhesion IV, The Meaning of Tack Temperature," In Journal of Polymer Science, Vol. VII, No. 5, pp. 463–471 (1951).
ASTM Designations: D907–642, "Standard Definitions of Terms Relating to Adhesives," Revised Aug. and Dec. 1964, pp. 274–275, 280.
Sharpe; Louis H. and Harold Schonhorn, "Surface Energetics, Adhesion, and Adhesion Joints," American Chemical Society's Contact Angle, Wettability, and Adhesion: The Kendall Award Symposium Honoring William A. Zisman, Sponsored by the Div. of Colloid and Surface Chem. 144th meeting, Los Angeles, Calif., Apr. 2–3, 1963, pp. 189–201, Washington, D.C., American Chemical Society. (Advances in Chemistry Series 432).

*Primary Examiner*—Philip Anderson
*Attorney, Agent, or Firm*—J. J. O'Connell

[57] ABSTRACT

An improved process for expanding the cross-section of a blank of thermoformable material when the thermoformable material contains residual stresses and associated frozen-in-strains which comprises annealing the blank to remove such stresses and strains therefrom prior to the expansion of the blank.

28 Claims, 14 Drawing Figures

3,919,380

PROCESS FOR EXPANDING ANNEALED THERMOFORMABLE MATERIALS

CROSS-REFERENCE TO RELATED PATENT APPLICATION

This patent application is a continuation-in-part of application Ser. No. 213,432 filed Dec. 29, 1971, now abandoned.

BACKGROUND OF THE INVENTION

1. Field of the Invention

This invention relates to the art of forming or shaping end use objects from thermoformable materials.

2. Description of the Prior Art

In pending U.S. patent application Ser. No. 213,702 entitled Process For Expanding Thermoformable Materials And Products and filed on Dec. 29, 1971 in the name of Walter H. Smarook, and now abandoned there is disclosed a low pressure process for expanding the cross-section of a blank of thermoformable material with the attendant formation of one or more voids of reduced pressure, i.e., a partial vacuum, within the cross-section of the blank. The process comprises venting the voids during the expansion of the cross-section of the blank so as to equilibrate the lower level of pressure within the voids with the higher level of ambient pressure without the blank of thermoformable material so as to thereby regulate the uniformity and integrity of the resulting cross sectional geometry of the expanded blank. The process is useful for the preparation of various types of articles of commerce having an expanded cross section.

Generally, any thermoformable material may be used in the blank whose cross-section is to be expanded. In order to form the blank, however, which is usually in the shape of sheet, film, netting and the like, it is necessary in some cases to press out the thermoformable material into such shape. Under such molding conditions physical molded-in stresses and associated frozen-in-strains may be introduced into the blank. These residual stresses and associated frozen-in-strains in the blank impose restraint to polymeric flow upon attempts to expand the blank in the process of U.S. Ser. No. 213,702.

The presence of such residual stresses and strains in the blank may be detected by testing a plaque or film of the resin in a polariscope. The presence of the stresses and strains is shown by the presence of changing colored fringe areas that predominant when the sample is freely roatated 90°C. between the polarizer and analyzer screens of the polariscope.

moreover, certain classes of resin which are otherwise widely used in the art of forming or shaping articles of commerce therefrom appear to be particularly susceptible to the formation of such stresses and strains therein during the press forming of blanks therefrom. These resins, when press-formed into blanks that are shaped so as to be otherwise adaptable for use in the blank expansion process, cannot be readily used in such expansion process.

SUMMARY OF THE INVENTION

The cross section of a blank of thermoformable material having residual stresses and associated frozen-in-strains therein is expanded by first annealing the blank prior to the expansion process.

An object of the present invention is to provide a process wherein the cross section of blanks of press formed thermoformable material having residual stresses and associated frozen-in-strains therein may be readily expanded by the process of U.S. patent application Ser. No. 213,702.

A further object of the present invention is to provide a process wherein press formed blanks prepared from resins such as polyvinyl halide resins, polyvinylidene halide resins, polyurethane resins, polycarbonate resins, and polyarylene polyether resins, may have their cross-sections readily expanded by the process of U.S. patent application Ser. No. 213,702.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means that temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C. The Ta values reported here specifically relate to the Ta of the polymer when the polymer is being adhered to an aluminum substrate. The Ta value will be essentially the same for other substrates.

of a blank of such thermoformable materials so as to cause the concurrent formation of one or more voids of reduced pressure, i.e., a partial vacuum, within the expanding cross-section of such blank and venting the voids during the expansion of such cross-section so as to equilibrate the lower level of pressure within the voids with the higher level of ambient pressure outside the blank and thereby regulate the uniformity and integrity of the resulting cross-sectional geometry of the expanded blank. The expansion of the blank is conducted in the present invention while the annealed blank is heated so as to place the thermoformable material in a thermoformable state, i.e., the blank is

| Polymer | Tg | Tm | Ta |
|---|---|---|---|
| 1. polyethylene Density=0.96 M.I.=3-5 | — | 126 | 135–140 |
| 2. polyethylene Density=0.94 M.I.-12–15 | — | 122 | 130–135 |
| 3. polyethylene Density=0.924 M.I.=1.2 | — | 100–108 | 120 |
| 4. polyvinyl chloride | >5 | — | 155 |
| 5. Nylon-6 | 60 | 215–220 | 240 |
| 6. Nylon-6,6 | 65 | 260 | 270 |
| 7. Polycaprolactone | — | 58 | 60 |
| 8. Polyurethane (polyester) | — | 130–170 | 160–180 |
| 9. Polysulfone | 185 | — | 300 |
| 10. polypropylene | −5 to 0 | 165–170 | 170 |
| 11. polycarbonate | 150 | — | 225 |
| 12. polymethylmethacrylate | 90 | — | 160 |
| 13. polystyrene | 100 | — | 185 |
| 14. polystyrene (impact grade) | 100 | — | 180 |
| 15. polyacetal | −60 | 165 | 170 |
| 16. 90/10 mol % copolymer of polymethacrylonitrile & styrene | 115 | — | 240 |
| 17. 70/30 mol % copolymer of polyvinyl alcohol and polyvinyl acetate | 50–60 | — | 120–130 |
| 18. 94.2/5.7 mol % copolymer of ethylene and ethyl acrylate | −20 | — | 110 |
| 19. 91.8/8.2 mol % copolymer of ethylene and acrylic acid | 18 | — | 110 |
| 20. 82/18 wt. % copolymer of ethylene and vinyl acetate M.I.=2.3 | −15 | — | 120 |
| 21. styrene-butadiene copolymer | 90 | — | 190 |
| 22. styrene-acrylonitrile copolymer | 100 | — | 190 |
| 23. hydroxy propyl cellulose | 100 | — | 110 |
| 24. (solution blend of) polystyrene and polyphenylene oxide | 115–120 | — | 235 |
| 25. cellulose acetate | 120 | — | 170 |
| 26. acrylonitrile-butadiene-styrene terpolymer | 100–104 | — | 180 |
| 27. copolymer of ethylene and Na salt of methacrylic acid | — | 98 | 130 |

It has now been found that the cross-section of a blank of thermoformable materials having residual stresses and associated frozen-in-strains therein as a result of the press-forming of such blank may be readily expanded in the process disclosed in U.S. patent application Ser. No. 213,702 if the blank is annealed to remove such stresses and strains therefrom prior to the expansion of the blank.

The process of U.S. patent application Ser. No. 213,702 is used to pull a blank of material between a pair of oppositely positioned mold plates. More specifically, this process involves expanding the cross-section heated to a temperature which is ≥ the fusion point of the thermoformable material. The thermoformable material is expanded between a pair of separable mold plates, which mold plates are moved apart to effect the desired expansion of the annealed blank of thermoformable material, while the blank is attached to the surface of such mold plates, in one way or another as disclosed below, during the expansion operation.

Unless the annealing step of the present invention is used with blanks having residual stresses and associated frozen-in-strains therein, prior to the use of such blanks in the process of U.S. patent application Ser. No.

213,702, the blank may be prevented, in whole or in part, from adhering to the surfaces of the mold plates during the expansion step in the process, or the rib memebers in the resulting expanded blanks may be ruptured. The annealing of the blank is preferably conducted prior to the insertion of the blank between the mold plates, although it can be conducted between the heated mold plates and prior to the expansion step in the process, if the blank is not clamped between the mold plates during the annealing step so as to prevent relaxation of the stresses and strains.

STRESS-SUSCEPTIBLE RESIN

Figure 1:
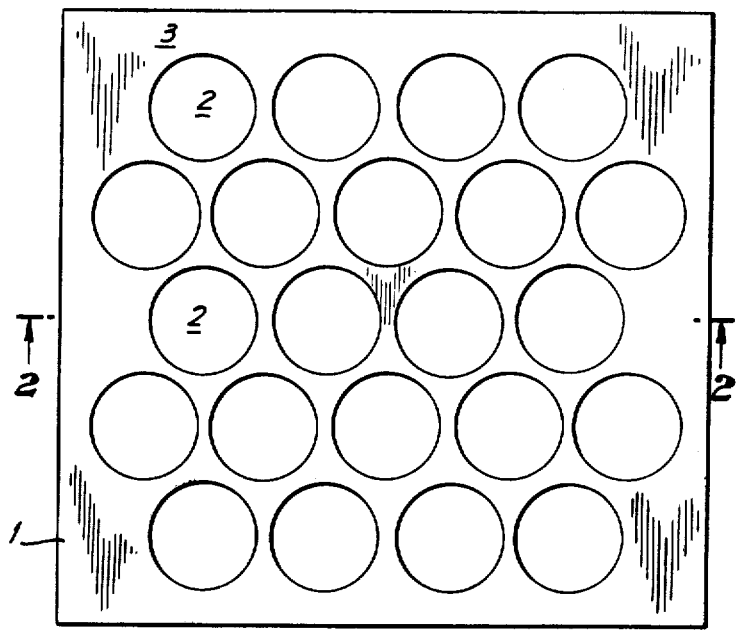
FIG. 1 shows a top view and FIG. 2 shows a cross-sectional view of a perforated mold plate which may be used in the process of the present invention.

The resins which are used in the process of the present invention are thermoformable resins which are susceptible to the formation of stresses and associated frozen-in-strains therein when the resins are pressed formed, or otherwise subjected, during a molding operation, to a molecular orientation which gives rise to such stresses and strains, into the blanks whose cross-section is to be expanded. The susceptibility of these resins to such stress and strain formation under such molding conditions arises due to the fact that they are physically restrained during the forming operation while in the molten stage, and the locking-in of the residual stresses and associated frozen-in-strains then arises due to volumetric changes in the mass of the resin during the cooling and solidification of the shaped mass.

These stress and strain susceptible resins particularly include resins formed from vinyl halides and vinylidene halides such as polyvinyl chloride, polyvinyl fluoride, polyvinylidene chloride, polyvinylidene fluoride, polyvinylidene bromide and the like; polyurethane resins polycarbonate resins and polyarylene polyether resins.

The polyurethane resins include the polyether and polyester types.

The polycarbonate resins which may be employed in the present invention are those solid polymeric resins which contain in their polymeric chain, a plurality of carbonyl dioxy or carbonate groups, i.e.,

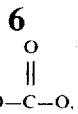

or carbonyl monoxy groups, i.e.,

linked by divalent carbon atom containing radicals.

The polycarbonate resins which may be employed in the present invention thus include homopolymers which have the general formula I 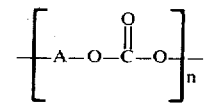

wherein n is a whole number representing the number of recurring units and it is >1, A is a divalent organic radical in which the terminal atoms are carbon atoms, and copolymers which have the general formulae IIA 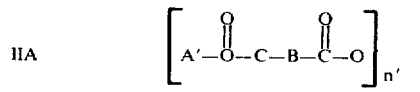

and IIB 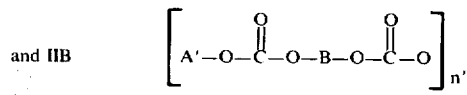

wherein, in each of IIA and IIB $n'$ is a whole number representing the number of recurring units which is >1, A' and B are different divalent organic radicals in which the terminal atoms are carbon or nitrogen atoms in IIA and carbon atoms in IIB. A, A' and B may be aliphatic or aromatic in nature. These radicals are devoid of substituent groups which would interfere with the preparation of the resins, that is, groups that would be reactive in the systems employed in such preparations.

Examples of such radicals are substituted and unsubstituted alkylene and alkylidene radicals such as methylene, ethylene, propylene, propylidene, isopropylidene, butylene, butylidene, isobutylidene, amylene, isoamylene, amylidene, isoamylidene, and the like; two or more substituted or unsubstituted alkylene or alkylidene groups connected by a non-alkylene or non-alkylidene group such as an aromatic linkage, a tertiary amino linkage, an ether linkage, a carbonyl linkage, or by a sulfur-containing linkage such as sulfide, sulfoxide, sulfone, and the like; a substituted or unsubstituted alkylene, alkylidene or cycloaliphatic group containing ethylenic unsaturation; a substituted or unsubstituted aromatic radical such as phenylene, naphthalene, biphenylene; two or more substituted or unsubstituted aromatic groups connected through non-aromatic linkages; or a substituted or unsubstituted aralkyl radical such as tolylene, xylylene and the like. Preferably, the unsubstituted radicals contain from 2 to 10 carbon atoms.

The preferred aliphatic organic radicals are the cycloalkylene radicals, and notably the tetraalkyl cycloalkylene radicals. The most preferred of such aliphatic radicals are the tetraalkyl-1,3-cyclobutylene radicals, such as 2,2,4,4-tetramethylcyclobutylene-1,3; 2,4-dimethyl-2,4-diethylcyclobutylene-1,3; 2,2-diethyl- 4,4-dimethylcyclobutylene-1,3; 2,2,4,4-tetraethylcyclobutylene-1,3; 2,2,4,4-tetra(2-ethylhexyl)cyclobutylene-1,3; 2,2-diisopropyl-4,4-dibutylcyclobutylene-1,3; and 2,2,4-trihexyl-4-methylcyclobutylene-1,3. The preferred aromatic group containing radicals are phenylene and bis(4,4'-phenyl)isopropylidene.

The preferred homopolymers have the structures:

III 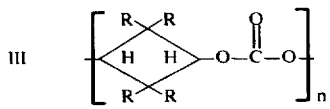

and IV 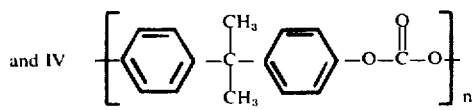

The preferred copolymers have the structures:

V 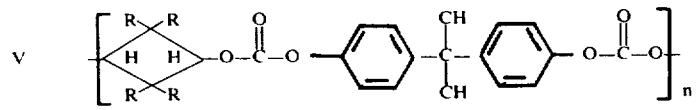

VI 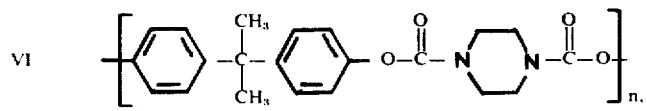

and VII 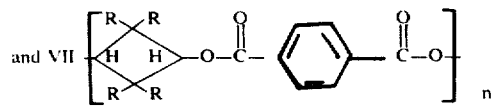

wherein such structures n is as indicated above and R in each occurrence is a straight or branched chain alkyl group containing from 1 to 8, and preferably, from 1 to 2 carbon atoms.

The number of repeating units, n, is such as to provide resins which are solid at room temperature and which have softening points of at least about 80°C., and preferably of at least about 100°C.

A more detailed listing of some of the useful polycarbonate resins and processes for preparing them are disclosed in U.S. Pat. Nos. 3,161,615; 3,220,973; 3,312,659; 3,312,660; 3,313,777; British Pat. No. 1,011,283 and "Chemistry and Physics of Polycarbonates" by Hermann Schnell, 1964, Interscience Publishers, which disclosures are incorporated herein by reference.

The polyarylene polyether materials which are used in the present invention are solid thermoplastic materials having repeating units of the structure.

where E and E' are as defined below. These polyarylene polyether materials will have molecular weights of about 10,000 to 100,000; second order glass transition temperatures of about 130° to 320°C.; and melt indices of about 1 to 20. The preferred of these polyarylene polyether materials are polysulfone resins having repeating units of the structure

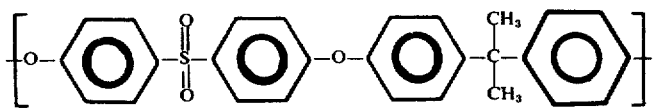

The polysulfone resins have molecular weights of about 15,000 to 50,000 as indicated by reduced viscosity values of about 0.4 to 0.7 dl/gm. at a concentration of 0.2 g/100 ml. in $CHCl_3$ at 25°C.

E is the residuum of a dihydric phenol and E' is the residuum of a benzenoid compound having an inert electron withdrawing group in at least one of the positions ortho and para to the valence bonds, and both of said residua are valently bonded to the ether oxygen atoms through aromatic carbon atoms.

The residua E and E' are referred to in this manner since the polyarylene polyether polymer is conveniently made by the reaction of an alkali metal double salt of a dihydric phenol and a dihalobenzenoid compound having the electron withdrawing group.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols" such as, for example, the 2,2-bis-(4-hydroxyphenyl)propane, 1,1-bis-(4-hydroxyphenyl)-2-phenyl ethane, bis-(4-hydroxyphenyl)methane, or the chlorinated derivatives containing one or two chlorines on each aromatic ring.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benezene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

The materials which may be employed as the blanks in the present invention are normally solid thermoformalbe materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks may be used in various forms such as sheet, netting and sheet with punched out designs. The fusible material used for the blank need not have any elastomeric qualities.

The polymers from which the blanks are shaped may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount", that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the process of the present invention, it is possible that expanded blanks of the present invention can also be made wherein a low melting metal, or alloy or compound thereof, can be used as the blank with mold plates made from non-fusible materials, or materials having higher fusion points than such low melting metallic materials.

Various polymeric resins used as the expandable blanks tend to pick up moisture when exposed to the atmosphere, i.e., about 0.05 to 5.0 weight percent. This moisture is preferably removed from the plastic before inserting the plastic in the hot press so as to avoid blistering or bubbling in the heated plastic. The plastics which are more susceptible to this type of moisture absorption are the polycarbonate resins, polymethymethacrylate resins, nylon resins, cellulose acetate resins, acrylonitrilebutadiene-styrene terpolymer resins, hydroxy propyl cellulose resins, styrene-acrylonitrile copolymer resins and phenoxy resins.

FORMING OF THE BLANKS

The processing equipment which is used in the formation of the blanks which are used in the process of the present invention and which lead to the creation of residual stresses and associated frozen-in-strains in the thus formed blanks include slot die extruders, roll calendars, sheet planishers, compression molding presses and contour extruders. These devices are used in shaping processes which are characterized in the art as calendaring, compression molding, slot die extrusion and contour extrusion. In these processes the blank is formed in the processing equipment at temperatures of the order of 10° to 100°C. above the melt temperature of the plastic and at pressures of the order of 10 to 1,000 psig., depending on the particular polymeric material being processed, its molecular weight, molecular weight distribution, and thickness of the molded article.

ANNEALING OF THE BLANKS

The annealing of the blank prior to the expansion process is conducted at temperatures which range from about 10°C. below the heat distortion temperature of the plastic up to the melt temperature of the plastic for sufficient time to remove the stresses and strains from the blank to the point where such stresses and strains are not evident upon examination of the plastic in a polariscope. This usually requires an annealing period of about 5 to 240 minutes depending on the resin being treated, the annealing temperature, the amount of stress and strain in the blank, and the thickness of the blank.

Various polymeric resins used as the expandable blanks tend to pick up moisture when exposed to the atmosphere, i.e., about 0.05 to 5.0 weight percent. This amount of moisture is preferably removed from the plastic before inserting the plastic in the hot press so as to avoid blistering or bubbling in the heated plastic. The plastics which are more susceptible to this type of moisture absorption are the polycarbonate resins, polymethylmethacrylate and the nylon resins. The removal of the moisture, where necessary, can be conducted simultaneously with the annealing step. It can also be conducted on the resin before it is formed into the sheet or other form in which the resin is to be used in the expansion step of the process of the present invention.

THE EXPANSION PROCESS

The process of the present invention is based upon the property of various materials, and particularly thermoplastic polymeric materials, to exhibit hot-tack adhesion to practically all substrates at a temperature, Ta, which is usually above the Tg or Tm of the thermoplastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its Tm or Tg.

Thus, if a blank of thermoplastic polymeric material is placed between two mold plates of a heated press so that the temperature of the mold plates is about Ta or 5° to 10°C. above the Ta of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surfaces and the fused material.

Although the mass of the expanded fusible material does not change, the cross-sectional configuration of the fusible material is expanded in the direction of the two separate plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occuring. The strength of the bond will thus depend on the nature of the thermoplastic resin in the blank, the nature of the mold plate materials, the extent of the surface area of the mold plate which is in contact with the fused blank and the cohesive strength and flow properties of the polymeric plastic.

Thus, the use as mold surfaces, of materials which are more readily wet by the fused plastic blank, will allow for a wider separation of the mold surfaces with the fused plastic bonded thereto, than would the use of mold surfaces made from materials which are not as readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure, i.e., having a partial pressure therein, are formed within the body of the expanding plastic. Thus, although the mass of plastic does not change, the volume of the expanding cross-section of the plastic does increase. The frequency of the occurrence of these voids, as well as their size and shape, i.e, the pattern of the voids, is largely determined by the pattern of the points or areas of contact which exist between the mold surfaces and the expanding plastic during the expansion process. In order to maintain the desired pattern of the voids, it is necessary to vent the voids during the expansion step so as to equilibrate the lower level of the pressure within the voids with the higher level of ambient pressure without the expanding material.

The pattern of the points or areas of contact between the mold surfaces and the thermoplastic blank can be readily varied.

For the purposes of the present invention a means for providing such pattern of contact can be generally characterized as perforation means, and such perforation means are used to provide a pattern of individual and separate perforations at the interfaces between the top and bottom surfaces of the blank and the blank contact surfaces of the two plates when the blank is inserted in the press between the two mold plates.

These perforations may be, at the plane of the interface between the mold plate and the blank, arcuate as in the shape of a circle or elipse, or angular, as in the shape of a triangle, rectangle, hexagon, or in the shape of a planar figure having both arcuate and angular sides, such as a hemisphere, or a section of a circle.

The perforations employed at each of the interfaces between the mold plates and the blank during the expansion of a blank are usually of the same size and shape, although they need not be. Different sized and/or shaped perforations may be used at one or both of the two interfaces.

In a preferred mode of operation of the process of the present invention the blank of thermoformable material which is to be expanded is inserted between a pair of mold plates, one of which is positioned above the blank, and which may be termed the top or upper mold plate, and the other of which is positioned below the blank, and which may be termed the bottom or lower mold plate. In this embodiment the blank is expanded between the two mold plates in a vertical plane or direction. The blank, however, may also be expanded in a horizontal plane or direction by positioning the two mold plates at either side of the blank and otherwise conducting the process as in the manner of the vertical expansion process. In such a horizontal expansion process one of the mold plates could be characterized as the bottom mold plate, and the other the top mold plate.

The perforation means which is used at the interface between the top mold plate and the top surface of the blank may be termed the upper perforation means, and the perforation means which is used at the interface between the bottom mold plate and the bottom surface of the blank may be termed the lower perforation means. In the process of the present invention the perforations in the upper perforation means are not aligned, in the vertical plane, with the perforations which are in the lower perforation means. That is, the perforations in the upper perforation means are either not of the same size or shape as the perforations in the lower perforation means, or if they are of the same size and shape, the pattern of the perforations in the upper mold plate is so positioned or arranged so that, in the vertical plane, there is, at most, only a partial alignment of any one perforation in the upper perforation means with any one perforation in the lower perforation means. The two perforation means can thus be so designed and positioned that there is no overlap at all, in the vertical plane, between any one perforation in the upper perforation means and any one perforation in the lower perforation means. In the preferred embodiment of the present invention, however, the two perforation means are so designed and positioned that each perforation in each of the perforation means overlap, in the vertical plane, two or more perforations in the other perforation means.

In a preferred mode of operation of the process of the present invention the pattern of the areas of contact between the surfaces of the blank and the surfaces of the mold plates is provided by using, as the bottom plate and the top plate, perforated plates as the perforation means. The perforated plates will only provide contact with the surfaces of the sheet facing such plates at the non-perforated area of such plates.

The desired pattern of contact areas can also be supplied to the contact surfaces of the two mold plates or the blank with other perforation means. A negative of the desired pattern can be used as such other perforation means and it can be affixed to the contact surface of the sheet which is to contact the mold plates or affixed to the contact surface of the mold plates themselves, in the form of masking means, such as cut-outs in circular, elliptical, hexagonal, rectangular, triangular, etc., form of masking tape, kraft paper, "Mylar film" or other materials which will prevent the fused thermoplastic material from adhering to the surface of the mold plates. Thus, the fused plastic will only be allowed to adhere to the surfaces of the mold plates at those areas of contact between the surfaces of the mold plates and the sheet where there is no masking means present.

These "negatives" thus function, when used as perforation means in the process of the present invention, in a manner of procedure which is directly opposite to that of the perforated mold plates, the use of which as perforation means is discussed above. These "negative" perforation means thus prevent contact at the interface between the surfaces of the blank and the contact surface of the two mold plates at those places at the interface where such "negative" perforation means are present. The use of the perforated mold plates, on the other hand, provides a lack of contact at such interface where the blank contact surfaces of the mold plates are not present, i.e., at the areas of the interface adjacent the perforations in the mold plates. Each of these two types of perforation means, does, however, function in the same basic manner, that is, each provides a pattern of perforations in the interface between the contact surfaces of the mold plates and the surfaces of the blank.

Thus, it may be said that the cross-sectional geometry of the expanded blank is a function of the design of the areas of contact which is provided in the contact surfaces of the mold plates, or the surfaces of the negative perforation means, and which is to contact the blanks. It is such design which determines the extent to which the contact surface areas of the perforation means and the blank are kept in contact during the expansion step in the process, and the extent of such contact areas is what determines the pattern of the voids or cells in the expanding blank or sheet, and thus, in the cross-sectional geometry of the resulting expanded blank.

The voids or cells created in the sheet during the expansion step are vented through the two mold plates, or in the case of a the use of a negative perforation means, the voids or cells are vented from the outside of the blank and between the negative and the mold plate. Venting of the negative perforation means may also be accomplished by providing a vent hole over the negative perforation means which vent hold would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of a sheets having thicknesses of the order of about 40 to 300 mils, such blanks may be expanded $\geq$ 2 to 20 times such thicknesses according to the present invention by expanding the fused blank at a rate of separation of the mold plates of about 10 to 150 mils per second.

After a desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expanded blank is cooled to a temperature below its heat distortion point, before being removed from the press so as to freeze, so to speak, the configuration of the expanded blank, and thus prevent distortion of such configuration.

The preferred process is thus one for expanding the cross-section of an annealed blank of thermoformable material between a pair of perforation means, wherein each of the perforation means provides perforations adjacent the interface of contact between the perforation means and the blank, and wherein the perforations in each perforation means are not aligned with the perforations in the other perforation means; the expanding of the blank being attended or accompanied by the formation of one or more voids of reduced pressure, i.e., having a partial vacuum therein, within the cross-section of the expanding blank, with the pattern of occurrence of such voids being in response to the pattern of perforations in the perforation means, and wherein the voids are vented during the expanding of the blank so as to equilibrate the lower level of pressure within the voids with the higher level of ambient pressure without the blanks and thereby regulate the uniformity and integrity of the resulting cross-sectional geometry of the expanded blank.

The preferred perforation means are perforated mold plates and the blank is usually adhesively bonded, and preferably by hot tack adhesion, to the non-perforated surfaces of such perforated mold plates during the expansion or pulling process.

In a preferred embodiment of the process of the present invention it may be said that the cross-section of a blank of thermoformable material having a Ta and residual stresses and associated frozen-in-strains therein is expanded between a pair of perforated mold plates so as to provide an integrally formed article of commerce having an expanded cross-section in the following sequence of steps:

annealing the thermoformable material to relax the residual stresses and associated frozen-in-strains therein, inserting the annealed material between the mold plates while the annealed material is heated to a temperature which is $\geq$ the Ta of the material, the perforations in each of said mold plates being non-aligned with the perforations in the other mold plate, adhesively bonding the annealed material by hot tack adhesion to each of the mold plates at the non-perforated portions of the perforated surfaces of the mold plates, pulling the mold plates apart, while the annealed material is thus adhesively bonded thereto, so as to expand the cross-section of the annealed material and thereby effect within said annealed material one or more voids having a partial vacuum therein, venting the voids during the pulling apart so as to equilibrate the lower level of pressure within the voids with the higher level of ambient pressure without the material and thereby preserve the pattern and the integrity of the voids in the resulting cross-sectional geometry, and cooling the expanded annealed material to a temperature below the heat distortion point of the annealed material.

In the preferred mode of operation the alignment of the perforations in the two mold plates is such that there results in there being, during the expansion process, an overlap by the perforations in each of the mold plates with respect to at least one, and usually two or more, of the perforations in the other mold plate. This overlap occurs in the vertical plane where the mold plates are used one over the other and they are expanded in a vertical direction; or in the horizontal plane where the mold plates are used on either side of the blank, and the mold plates are expanded in a horizontal direction. The venting of the voids is readily accomplished through the perforated mold plates.

The mold plates which are to be used may be disengageable from the device used to move them apart during the expansion step of the process described above. One or both of the mold plates can also be more permanently affixed to such device, in which case, the cooled, expanded thermoformable material is then removed from the device and the mold plate(s) affixed thereto.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can be mechanically stripped from the mold plates without disrupting the integrity or configurations of the expanded blank.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the process of the present invention can be obtained from the process sequences illustrated in FIGS. 1 to 7 of the drawings.

Figure 2:

FIG. 1 shows a top view and FIG. 2 shows a cross-sectional view of a type of perforated mold plate 1 which may be used in the process of the present invention. Perforated mold plate 1 is a thin sheet of material such as aluminum or steel in which a series of regularly spaced perforations 2 are punched, so as to provide a pattern of staggered rows and columns of such perforations. The perforations may have either or both of arcuate and straight sides. The perforations 2 in mold plate 1 are all circular in shape. Each of perforations 2 are the same size circular perforation, with the various perforations being separated from each other by the continuous portion 3 of the surfaces of mold plate 1. Perforations 2 function as the perforation means discussed above, and the continuous surface 3 of mold plate 1 provides the mold plate contact surface which will contact the contact surfaces of the blank during the expansion process.

Figure 3:
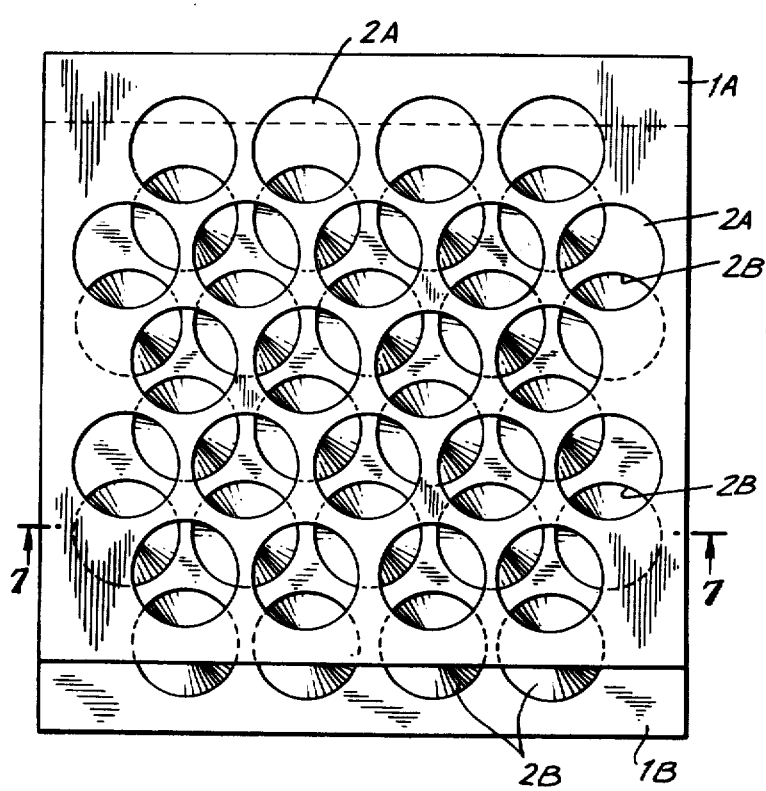
FIG. 3 shows, in perspective, a pair of the mold plates of FIGS. 1–2 in a non-aligned position.

FIG. 3 shows a top view of two mold plates 1, one positioned over the other. The position of the two plates with respect to each other, in the vertical plane, is such that the perforations in the two plates are not aligned. Thus each of the perforations 2A in the upper plate 1A overlap, in such vertical plane, one or more of the perforations 2B in the lower plate 1B. This pattern of overlap is occasioned by the size, shape and spacing (staggering) of the rows and columns of perforations in each plate, as well as by the positioning of one plate, in the vertical plane, with respect to the other. This same pattern of overlap will prevail in the horizontal plane, if the position of the two mold plates with respect to each other is maintained, and they are both stood side by side on one of their thin edged sides.

Figure 4:
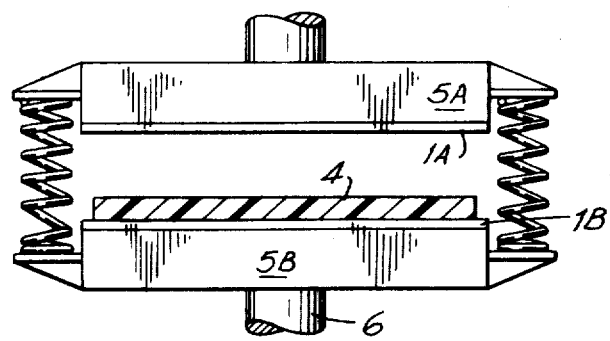
FIGS. 4–6 show a sequence of steps involved in increasing the cross-sectional area of an annealed blank of thermoformable material according to one embodiment of the present invention using two mold plates shown in FIG. 3.
Figure 5:
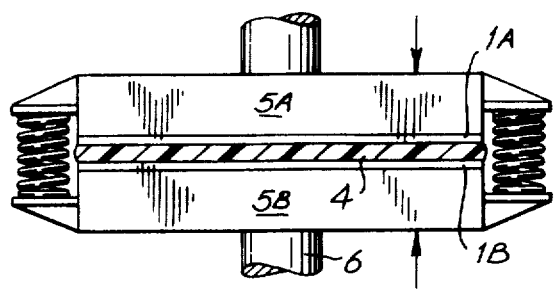
Figure 6:
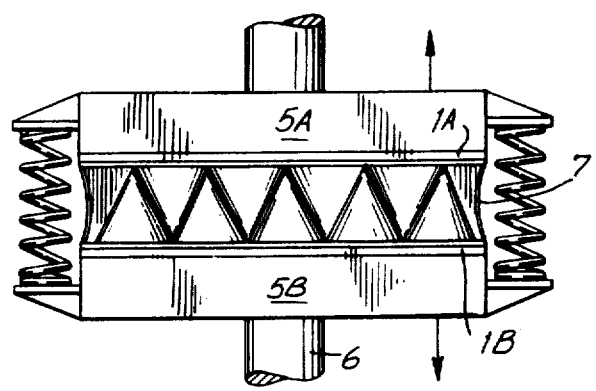

FIGS. 4 to 6 show a sequence of steps involved in using a mold plate 1 according to one modification of the process of the present invention as a top mold plate and as a bottom mold plate. In FIG. 4 there is shown a blank 4 of thermoformable material having a Ta, in the form of a smooth surfaced sheet of such material, which is inserted between the open platens, 5A and 5B, of a Carver press. To the face of each platen 5A and 5B of the press there are attached mold plates 1A and 1B, respectively. In the embodiment shown, upper mold plate 1A and lower mold plate 1B are positioned with respect to each other, in the vertical plane, as shown in FIG. 3. Mold plates 1A and 1B and platens 5A and 5B are heated, for the purposes of the present invention, to a temperature which is about Ta or 5° to 10°C. above the Ta of the blank 4. The mold plates 1A and 1B and the platens 5A and 5B may be heated before, preferably, or after the blank is inserted in the press. The mold plates are preferably heated conductively through the platens. The Carver press described herein is a 20 ton hand operated hydraulic ram 6 which actuates a movable lower platen 5B against a fixed upper platen 5A. In other presses, the upper mold platen can be movable with the lower platen fixed, or both platens can be movable. The platens are usually heated electrically. Although the Carver press is the preferred means for bringing the heated mold plates and platens into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 5, shows the press after it has been closed with sufficient pressure to cause the mold plates 1A and 1B to exert a slight pressure on blank 4 so as to cause the heated blank to wet the contact surfaces of mold plates 1A and 1B which come in contact with the blank. The amount of pressure required for this step is of the order of about 1 ounce to 4 pounds per square inch. The pressure causes the blank to be slightly compressed.

FIG. 6 shows the platens pulled apart after the expansion step, with the expanded blank 7 adhering to points or areas of contact with plates 1A and 1B.

Figure 7:
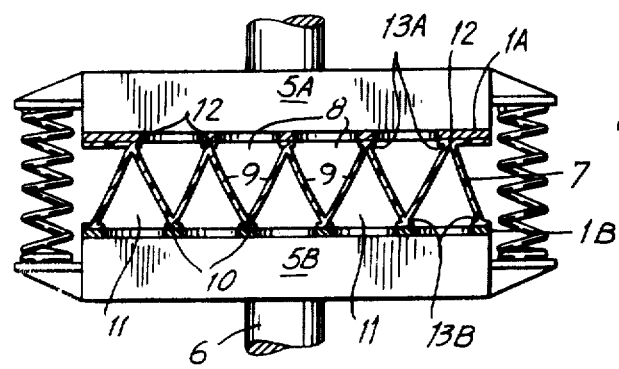
FIG. 7 shows a cross-section of an expanded blank made as disclosed in FIGS. 4–6 before it has been removed from the mold plates.

FIG. 7 shows a cross-sectional view of expanded blank 7 between top mold plate 1A and lower mold plate 1B after the expansion stop, but before the expanded blank is removed from the press or the mold plates. The cross-sectional view shows that the expanded blank has a plurality of cells, about one-half of which are cells 8 which are open at the top face of the expanded blank and closed at sides or walls 9 and apexed bases 10 thereof. The closed bases 10 of cells 8 were formed by contact of the blank 4 during the expansion process with continuous areas 3 of lower mold plate 1B. The remaining cells 11 are open at the lower face of the expanded blank and closed at sides or walls 9 and apexed tops 12 thereof. The closed tops 12 of cells 11 were formed by contact of the blank 4 during the expansion process with continuous areas 3 of upper mold plate 1A. Walls 9 are I beam shaped, and act as common walls for adjacent cells 8 and 11. The flanged portion 13A of each top or peak 12 of the lower cells tends to form a lip member, more or less continuously around the open end of each upper cell 8, and, similarly, the flanged portion 13B of the bases 10 of the upper cells 8 tends to form a lip member, more or less continuously, around the open end of each lower cell 11.

During the expansion step, as will be discussed in more detail below, areas of reduced pressure or cells 8 and 11 arise within the cross-section of the expanding blank 7. The side walls of the individual cells 8 and 11 are defined by rib-members 9 of the expanded blank. The limits of cells 8 and 11 are thus defined by the contact surfaces of the two mold plates and side walls 9. The reduced pressure in cells 8 and 11 is caused by the fact that each cell tends to become a sealed chamber when the blank 4 fuses to the contact surfaces of the mold plates 1A and 1B and as the mold surfaces are pulled apart, the sealed cells become enlarged, thus creating areas of reduced pressure. To prevent the higher ambient pressures from distorting or rupturing expanded walls 9 of the blank, the cells of the blank are vented during the expansion step so as to equilibrate the pressure within such cells with the ambient pressure outside the blank. This venting tends to preserve the pattern and the integrity of the resulting cross-sectional geometry of the expanded blank. In this embodiment of the present invention, the venting is accomplished through the perforations in the two mold plates and the imperfect seal that exists between the surfaces of platens 5A and 5B and mold plates 1A and 1B, respectively.

After the platens have been expanded the desired distance they are cooled to a temperature which is below the heat distortion point of the plastic in the blank. The cooling may be allowed to occur in the ambient air, or by circulating a cooling medium through the platens, or in some cases by a liquid coolant spray, or by conduction through cooled platens, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. The mold plate should also be disengagable from the rest of the press where the nature of the fusible blank and of the mold plate is such that the cooled expanded blank remains bonded to one or both of the mold plates. In the latter case laminates may be readily formed with the disengagable mold plates as skin laminae and the expanded blank as a core lamina. When such laminates are desired, similar or dissimilar mold plates can be used as to provide laminates with similar or dissimilar skin laminae, or even laminates wherein only one of the removable mold plates remains bonded to the cooled expanded blank.

Figure 8:
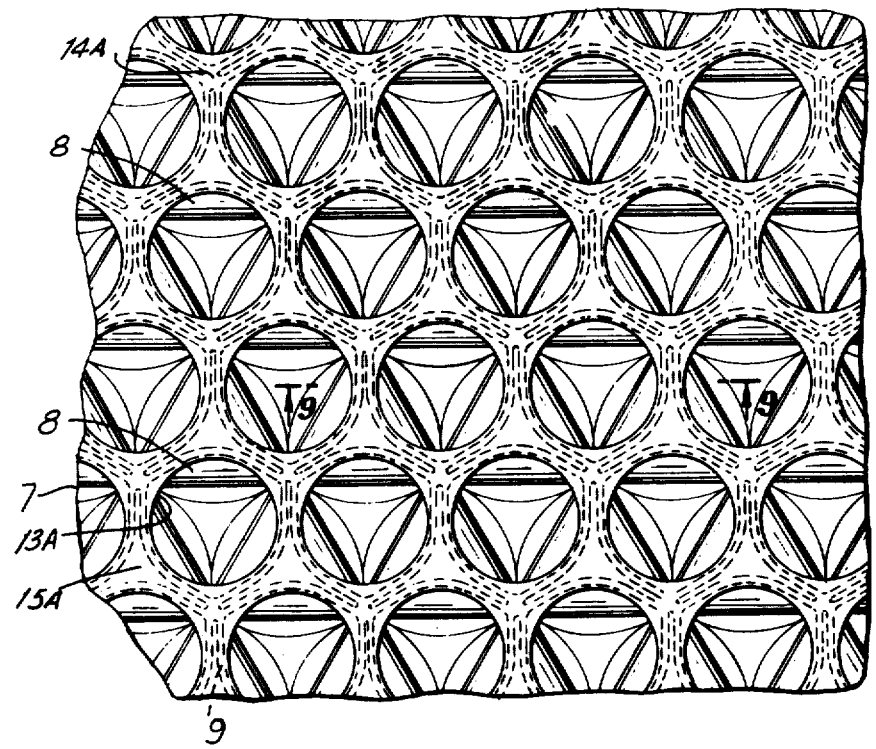
FIG. 8 shows a top view.
Figure 9:
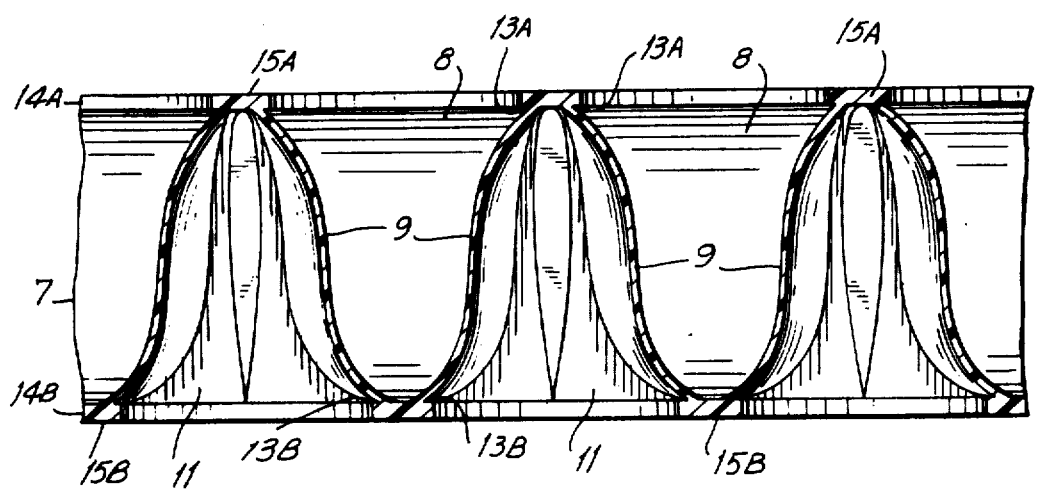
FIG. 9 shows a cross-sectional view, of such blank after it has been removed from the mold plates.

FIG. 8 shows a section of a top view, and FIG. 9 shows a section of a cross-sectional view of expanded blank 7, which has been produced as described above with reference to FIGS. 1–7, after it has been removed from the press and the platens. The top face 14A of expanded article 7 provides a replication of the blank contact surface of upper mold plate 1A to which it adhered during the expansion step. Thus the open ends of upper cells 8 replicate perforations 2 of mold plate 1A, and continuous portions or areas 15A of the top face of expanded blank 7 replicate the continuous areas 3 of mold plate 1A. In a similar manner the continuous surface 15B of lower face 14B of expanded blank 7 provides a replication of the blank contact surface of lower mold plate 1B. As seen in Flg. 8, each of the circular open ends of upper cells 8 overlaps, in the vertical plane, about three of the circular open ends of the lower cells 11 in the expanded blank. FIG. 9 shows that side walls 9 of the cells tend to be rotund, rather than flat. FIG. 8 shows lip member 13A around the opening of each cell 8, and FIG. 9 shows lip members 13A and 13B at the openings of cells 8 and 11, respectively.

For aesthetic, or other purposes, it may be desired to expand the cross-section of the blank in a non-uniform manner so as to provide expanded blanks which have cross-sectional areas of various degrees of thickness.

Figure 10:
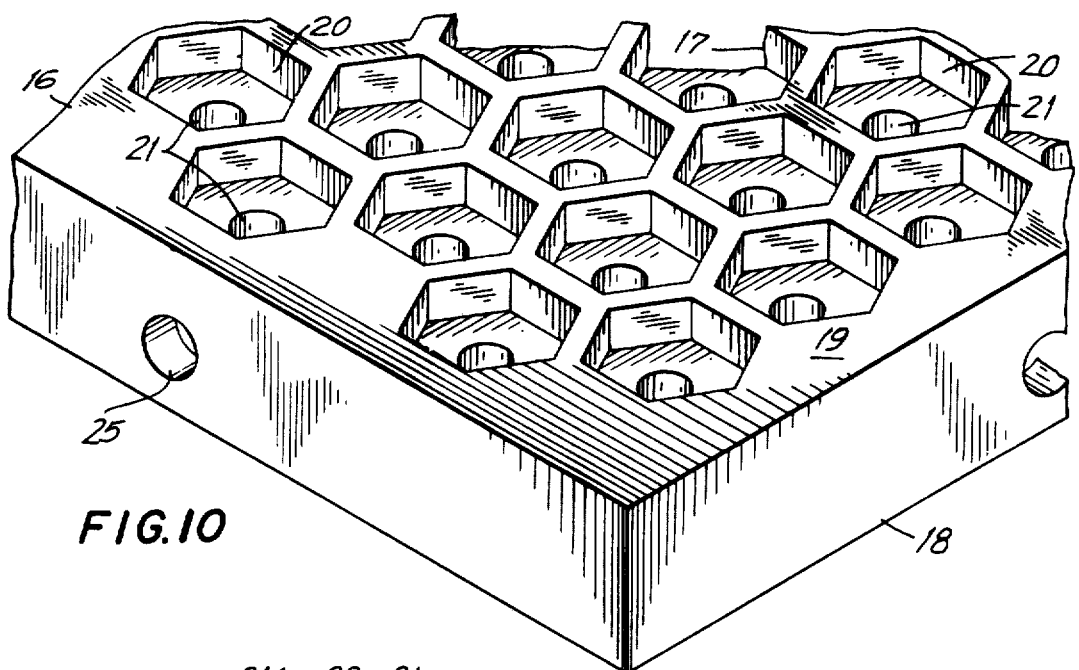
FIGS. 10, 11 and 12 show, partial top, bottom and cross-sectional views, respectively of a second type of perforated mold plate.
Figure 11:
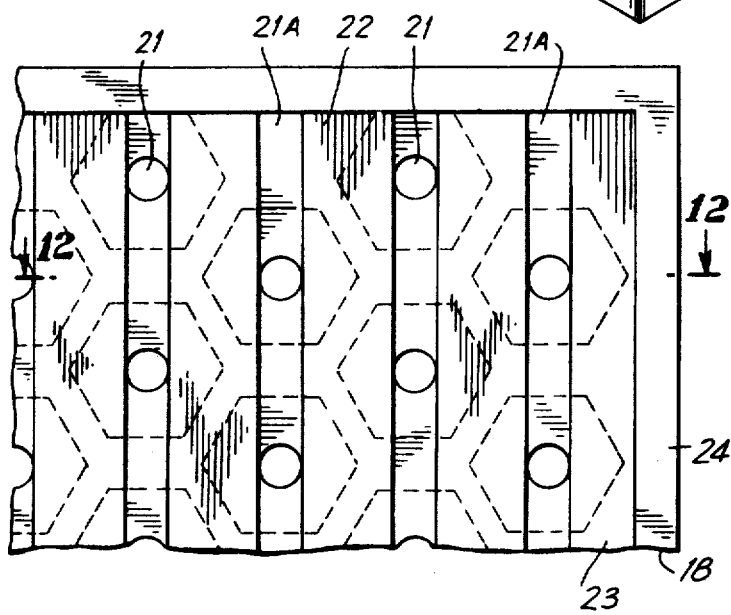
Figure 12:
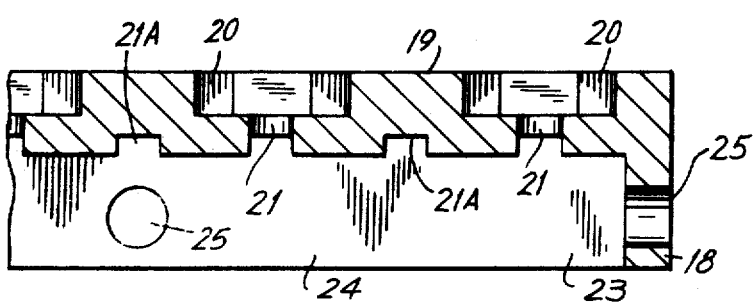

FIG. 10 shows a partial top view in perspective, FIG. 11 shows a partial view of the reverse side, and FIG. 12 shows a partial cross-sectional view, of another type of mold plate 16 which has a series of recessed cavities therein as perforations and which may be used as a mold plate in the process of the present invention. Mold plate 16 has a top sheet 17 of metal mounted on a hollow U-shaped frame 18. In the front face 19 of the sheet 17 a series of regularly spaced and staggered rows of hexagonal shaped perforations 20 were machined. Each of the hexagonal perforations 20 was only machined about half way through top sheet 17. In the center of the base of each of the hexagonal perforations 20 there was then drilled a small circular vent hole 21 through the remainder of sheet 17 and which exited out the other (back) face 22 of sheet 17. The circular vent holes 21 were about a third of the diameter of the hexagonal perforations 20. The hexagonal perforations 20 were all the same size. Vent holes 21 open out the back face 22 of sheet 17 to link each column of vent holes 21 to facilitate venting therethrough. Screw holes 25 are also provided in the walls of legs 24 for fastening mold plate 16 to the Carver press. Two of these mold plates 16 were used in a Carver press as described above to prepare the expanded blank shown in FIGS. 13–14. Venting of the back of the mold plate to the outside of the plate is accomplished through the open wall of U-shaped frame 24, which is not shown.

When inserted in the Carver press as the top and bottom plates thereof, the two plates 16 were positioned and aligned so that the two front faces 19 thereof faced each other and the hexagonal perforations 19 in the top plate were not completely aligned in the vertical plane, with the hexagonal perforations 19 in the lower plate. The hexagonal perforations 19 in the upper plate were positioned so that each of the perforations in the upper plate overlapped, in a vertical plane, two or more of the hexagonal perforations in the lower plate, as will be discussed in more detail below.

Figure 13:
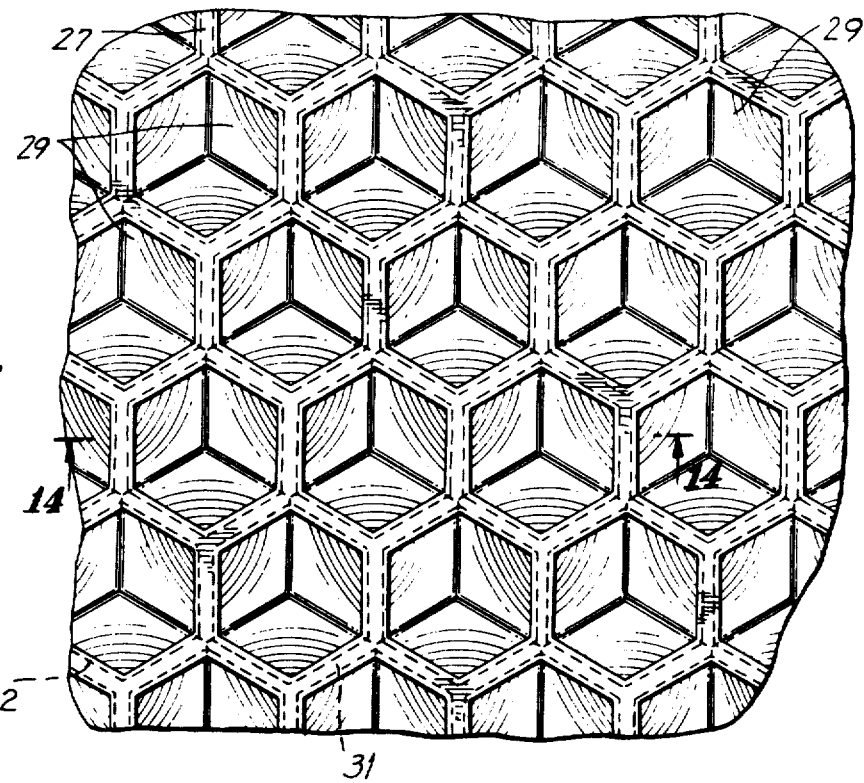
FIGS. 13–14 show a partial top and cross-sectional view of an expanded blank that may be made with two of the perforated mold plates of FIGS. 10–12.

FIG. 13 shows a top view of expanded blank 26. The top face 29 of expanded blank 26 provides a replication of the perforated surface of the upper plate of the press to which it adhered during the expansion step. The lower face 28 of the expanded blank is a duplicate of such upper face 27 and provides a replication of the perforated surface of the lower mold plate of the press to which blank 26 adhered during the expansion step. FIG. 13 thus shows that the alignment and positioning in the press of the two mold plates 16 that were used to prepare expanded blank 26 was such that each horizontal row of perforations 20 in the upper mold plate was aligned, in a vertical plane, with two of the horizontal rows of perforations 20 in the lower mold plate in such a way that each of the perforations 20 in the upper mold plate overlapped three adjacent perforations 20 in the lower mold plate. Each of the perforations 20 in the lower mold plate was overlapped to the same extent, in terms of overlapped surface area. This can be accomplished by first aligning each horizontal row of perforations 20 in the upper mold plate with a horizontal row of perforations 20 in the lower mold plate, and then shifting the upper mold plate on its X axis, with respect to the X axis of the lower mold plate, so that each perforation 20 in the upper mold plate overlaps two adjacent perforations 20 in the lower mold plate, and then further shifting the upper mold plate on its Y axis, with respect to the Y axis of the lower mold plate, so that each perforation in the upper mold plate overlaps a portion of three adjacent perforations 20 in the lower mold plate, with such latter three perforations in the lower mold plate including the two perforations 20 in the lower mold plate that were overlapped in the first shifting step. The shifting of the two mold plates with respect to each other can be such that one or the other, or both of the plates are shifted in their X and/or Y axis with respect to each other to accomplish the desired overlapping of the perforations in the two plates. The sequence of steps involved in the aligning and shifting of the mold plates is not critical. This is accomplished before the blank is inserted between the aligned and positioned mold plates.

Figure 14:
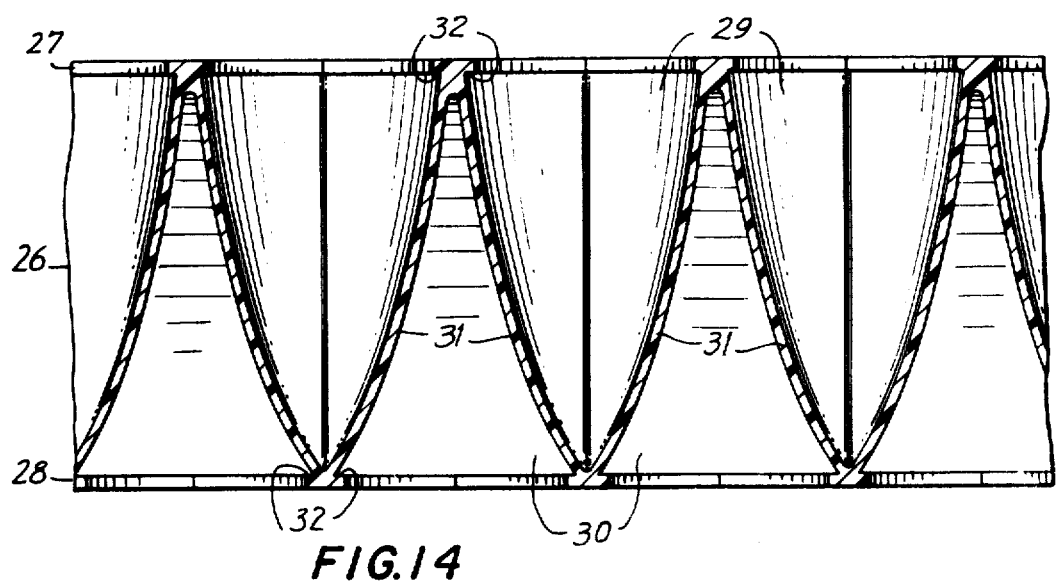

FIG. 14 shows a cross-section of expanded blank 26. Expanded blank 26 also provides two sets of regularly shaped and spaced cells which are open at one end and sealed at the other end thereof. Each cell is conical in shape. As shown in FIG. 14 one set 29 of such cells is open at the upper face 27 of blank 26, and sealed at the lower face 28 thereof, and the second set 30 of such cells is open at lower face 28, and sealed at upper face 27. The cells are separated by I beam shaped rib members 31. The rib members 31 defining each cell join together in an apex at the base of such cell to form a sealed base. The tops and bases of rib members 31 provide the continuous portion of the perforated top face 27 and base 28 of expanded blank 26. Lip members 32 which are present around the periphery of each cell 29 and 30 are not too pronounced because of the relatively close spacing and alignment of the perforations in the plates with which expanded blank 26 was prepared, and also because the perforations were angular and not circular or arcuate.

During the expansion of the sheet of plastic to form expanded blank cells 29 and 30 were vented, in turn, through the perforations 20, vent holes 21 and channels 21A and the open wall of U-shaped frame 18 in the upper and lower mold plates 16 of the press.

The amount of pressure used to pull the plates of the press apart in the process of the present invention is about 1 to 10 pounds per square inch of continuous surface area on the blank contact surface of the plates.

In all of the embodiments of the present invention shown above, the annealed blank is expanded between the perforated mold plates while the blank is heated to a temperature which is $\geq$ the Ta of the thermoplastic material in the blank, and while the blank is bonded to the non-perforated contact surface areas of the mold plates by hot tack adhesion. The pattern of the voids or cells in the resulting expanded blanks is thus in response to the pattern of contact between the contacting surfaces of the blank and the mold plates. Venting of the resulting cells during the expansion step so as to equilibrate the pressure within the cells with the pressure without the blank maintains the uniformity and integrity of the configuration of the resulting cross-sectional geometry of the expanded blank.

Thus, the process involved in preparing the expanded blanks shown in the drawings, which have an expanded cross-sectional geometry, which geometry comprises a plurality of cells separated by expanded ribs, by expanding a blank of annealed material having a Ta between a pair of perforated mold plates, and wherein the perforated surface of each of the mold plates has non-perforated surface area for contacting the blank, and the blank has two contacting surfaces, such as a sheet of plastic, could be more specifically described in a sequence of steps which comprises:

positioning the two mold plates with respect to each other so that the perforations in each plate face each other and are non-aligned, inserting the annealed blank between the perforated surfaces of the mold plates while the blank is heated to a temperature which is $\geq$ the Ta of the blank, bringing the mold plates and the blank into contact at the contacting surfaces thereof while the annealed blank is at said temperature of $\geq$ Ta so as to effect hot tack adhesion between the contacting surfaces, expanding the distance between the mold plates with the annealed blank thus adhesively bonded thereto so as to effect an expansion of the cross-section of the blank with the attendant formation within the expanded cross-section of a plurality of cells separated by expanded ribs of the material in the blank, such cells encompassing areas of reduced pressure, and the configuration of each, and of the combination of all, of the cells being in response to the pattern of contact between all of the contacting surfaces, venting the cells during the expansion so as to equilibrate the pressure within the cells with the pressure without the annealed blank and thereby maintain the uniformity and integrity of the configuration of the resulting cross-sectional geometry, and cooling the expanded annealed blank to a temperature below the heat distortion point of the material.

The perforations in the mold plates can be so provided that the same, or different, sized and/or shaped perforations can be used in each mold plate. Where the perforations in both mold plates are of the same size and shape, and the mold plates are pulled apart a uniform distance, the resulting cells in the expanded blank will be of uniform height and volume. Cells of different volume can be provided in the one panel by using mold plates having different sized or shaped perforations therein and/or by pulling the two mold plates apart a non-uniform distance.

The expanded plastic objects made in accordance with the present invention are lightweight panels that may be rigid or flexible depending on the plastic used therein, and the degree to which the plastic is expanded. Additional rigidity may be supplied by bonding the expanded plastic member to one or more rigid lamina. The expanded plastics may be used, with or without other lamina bonded thereto, as structural elements for containers, walls, partitions, lath, packaging and other applications where light weight structural elements are used.

For the most of the end use applications it is desirable, as noted above, to so expand the blank so that the integrity of the I-beam shaped wall members that separate the cells in the expanded blank is maintained. That is, the vacuums that arise in these cells are vented to avoid rupturing such wall members. For some applications, however, it may be desirable to intentionally cause a rupturing of such wall members. This can be accomplished, even while venting the vacuums in the cells, by continuing to expand the blank to such an extent that the wall members become thinner and thinner and eventually rupture, leaving punctures therein. The punctures can thus be provided uniformly in one or more of the wall members in all of the cells. The expanded blanks made with such ruptured wall members can be used to allow the passage of liquids or gases there through in various applications, such as screens, trickle-tower filling and air vents.

THE MOLD PLATES

The two perforated mold plates used to pull the blank apart can be made of the same or different materials. The mold plates may also be porous or non-porous, planar or non-planar and matching.

During the molding operation it is desirable as noted above, to vent the interior portions of the blanks which are being pulled apart. The need for venting the blanks being expanded, as noted above, arises due to the fact that a vacuum is created within the interior sections of the blank by virtue of the increase of the volume of such interior portions during the expansion operation. If the blank is not vented during the expansion operation, atmospheric pressure could cause puncture of the extended rib sections of the expanded blank during the expansion operation. This venting of the expanded blank can also be accomplished by using porous mold plates.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and tone materials such as marble and slate; building materials such as brick, tile, wallboard and concrete; and proteinaceous materials such as leather and hides.

Fusible materials having a relatively high Tg or Tm which could be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so-called engineering plastics, such as polytetrafluoroethylene, nylon-6 resins, polyacetal resins, polyvinylidene fluoride, polyesters and polyvinyl fluoride; or fusible materials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates after the expansion operation, when the cooled expanded blank would not otherwise readily separate from the mold plates.

For various applications it may be desirable to promote the adhesion of the expanded blank to the mold plates, as in the formation of laminates. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promoters may also be incorporated or admixed in with the components of the blank. In the latter case, the adhesion promoter is added to the blank in an amount of about 0.00001 to 5.0 percent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer of polymer, e.g., silane or siloxane. They may, in fact, be any silicon-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and Canadian Pat. No. 924,230.

Specific examples of such silyl peroxide compounds are vinyl tris(t-butylperoxy)silane, allyl tris(t-butylperoxy)silane, tetratris(t-butylperoxy)-silane, allyl(t-butylperoxy)tetrasiloxane, vinyl methyl bis(t-butylperoxy)silane, vinyl tris(α, α-dimethyl benzylperoxy)silane, allyl methyl bis(t-butylperoxy) silane, methyl tris(t-butylperoxy)silane, dimethyl bis(t-butylperoxy)silane, isocycnatopropyl tris(t-butylperoxy)silane and vinyl diacetoxy(t-butylperoxy) silane.

The amino alkyl alkoxy silanes would include those having the structure:

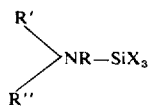

wherein X is alkoxy, aroxy or acryloxy; R is divalent alkylene of 3-8 carbon atoms with at least 3 sequential carbon atoms separating N from Si; at least one of R' and R'' is hydrogen, and any remaining R' or R'' is alkyl, $HO\text{-}[CH_2CH_2(O)_x]_{1-5}$ where $x$ is 0 or 1, $H_2NCO\text{—}, H_2NCH_2CH_2\text{—}$, and $H_2NCH_2CH_2NHCH_2CH_2\text{—}$.

Examples of such aminoalkyl-alkoxy silanes would include gamma-aminopropyltriethoxy silane, gamma-aminopropyltrimethoxy silane, bis(beta-hydroxy methyl) gamma-aminopropyl triethoxy silane and N-beta-(aminoethyl)gamma-aminopropyl triethoxy silane.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferable where the mold plates are to be perforated or porous, so as to effect the venting therethrough, or where laminates are to be formed.

The following examples are merely illustrative of the present invention and are not intended as a limitation upon the scope thereof.

The press used in these examples was a spring loaded Carber press, as shown in FIGS. 4 to 6 of the drawings. Two springs were used in the press snd each had a deflection of 130 pounds per inch, and the springs were designed to mechanically pull the platens apart, as explained above with reference to FIGS. 4 to 6, at a predetermined rate, as regulated by a needle valve on the hydraulic ram of the press. The platens of the press were 6 inches × 6 inches and were malleable cast iron and could be cooled by conduction, as desired, by the circulation of cold water therethrough. The platens of the press could also be heated by conduction, as desired, by heating platens 5A and 5B electrically. The temperature of the surfaces of both the heated platens and the mold plates was measured with a thermocoupled pyrometer.

EXAMPLE 1

This example discloses the attempted preparation of an expanded article as shown in FIGS. 1 to 9 of the drawings, when the blank of thermoformable material has residual stresses and associated frozen-in-strains therein, and the blank is not annealed.

The perforated mold plates used measured ⅛ inch × 6 inches × 6 inches. They were made of aluminum and had, as the perforations therein, regularly spaced holes measuring about ¾ inch in diameter. The holes were placed in aligned rows and columns in the plates, as shown in FIG. 1, with each hole spaced about 3/16 inch from the next adjacent hole. One of the perforated plates was then attached to each of the platens of a Carver Press so that the two perforated plates provided the overlap pattern for the perforations in the plates as shown in FIG. 3 of the drawings. The perforated plates were thus positioned on the faces of the top and bottom platens of the press so that the opening of each perforation of the upper perforated plate overlapped three of the perforations in the lower perforated metal plate.

The blank of thermoplastic resin used was a 6 inches by 6 inches × 150 mil sheet of rigid, unplasticized, polyvinyl chloride which had residual stresses and associated frozen-in-strains therein, as determined by polariscopic examination. The sheet of resin was dried in an oven overnight at 60°C. The resin had a Ta of 155°C.

The dried sheet of resin was then inserted between the perforated metal mold surfaces which were heated to 195°C. The press was closed to slightly compress the sheet of plastic and to effect hot tack adhesion between the sheet of plastic and the contact surfaces of the perforated plates as shown in FIG. 5. The temperature of the platens and the metal mold surfaces was allowed to equilibrate at 185°C. and then the press was opened to expand the plastic to a thickness of 2.40 inches at the rate of 15 mils/second. During the expansion step the resulting voids in the expanding plastic was vented through the perforations in the metal plates and through the interface between the perforated plates and the platens of the press. The expanded plastic was then cooled and it then readily separated from the mold plates.

During the expansion step there was some loss of adhesion between the mold plates and the plastic so that the expanded article was not pulled to a uniform height, and ruptures appeared in the wall members between the expanded cells. The expanded article had limited utility because of its non-uniform height and ruptured wall members.

EXAMPLE 2

A 6 inches × 6 inches × 150 mil sheet of the rigid polyvinyl chloride resin of Example 1 was processed and expanded as in Example 1 except that after being dried, and before being expanded, the sheet of resin was annealed for seven minutes at 162°C. The sheet of resin was then expanded to a height of 2.40 inches. There was no loss of adhesion of the resin to the mold plates during the expansion step. As a result, the expanded article was of uniform thickness and no ruptures appeared in the wall members between the cells in the expanded article. The expanded article thus had the configuration of the article shown in FIGS. 7–9 of the drawings. The cells were all of uniform volume and height. The panel was rigid and useful as a wall panel or other structural member.

EXAMPLE 3

A 6 inches × 6 inches × 100 mil sheet of polycarbonate resin (General Electric Company's Lexan polymer) was dried overnight at 60°C. The sheet of resin contained 4% by weight of carbon black and had a Ta of 225°C. The sheet contained residual stresses and associated frozen-in-strains, as determined by polariscopic examination.

An attempt was then made to expand the sheet of resin as in Example 1. The sheet of resin was inserted in the press at 245°C. and expanded at 235°C. to a height of 1.50 inches at a rate of 15 mils/second. During the expansion step there was a loss of adhesion over about 40% of the contact surface between the mold plates and the sheet of resin. As a result the expanded article was not expanded uniformly and holes or ruptures appeared in the walls between the cells. The panel was of little utility because of its non-uniform thickness and ruptured walls.

EXAMPLE 4

A 6 inches × 6 inches × 100 mil sheet of the carbon black filled polycarbonate resin of Example 3 was processed and expanded as in Example 3 except that after being dried, and before being expanded, the sheet of resin was annealed for 5 minutes at 176°C. The annealed sheet of resin was then expanded to a height of 1.50 inches. There was no loss of adhesion of the resin to the mold plates during the expansion step. As a result, the expanded article was of uniform thickness and no ruptures appeared in the wall members between the cells in the expanded article. The expanded article thus had the configuration of the article shown in FIGS. 7–9 of the drawings. The cells were all of uniform volume and height. The panel was rigid and useful as a wall panel or other structural member. It is to be noted that the annealing step in the process of the present invention is employed with respect to molded blanks of materials which have residual stresses and associated frozen-in-strains therein. These residual stresses and strains arise in the molded blank during the molding thereof, as a result of the molecular orientation of the polymer molecules in the thermoformable material in the blank. These molded blanks are commonly provided in the form of solid sheets of the thermoformable material. The annealing step can be conducted before or after the blank is inserted between the mold plates which are used in the expansion step of the process of the present invention. If the blank is to be annealed between such mold plates, however, it should be done while the blank is resting on one of the plates, and before it is clamped between the two plates. If the un-annealed blank is clamped between the two hot mold plates, it cannot be properly annealed, since it will adhere to both plates and the residual stresses and associated frozen-in-strains cannot be relaxed under such conditions. They can be relaxed however, if the blank is only resting on, and adhering to, one hot mold plate.

The annealing step does not cause any change in the Ta value of the resin being treated. The annealing step, however, will cause the heat distortion temperature of the blank to increase.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other than through the venting means. The difference between the level of ambient pressure and the level of reduced pressure existing under the partial vacuum conditions in the void areas is sufficient, in the absence of such venting, to rupture the relatively thin walls of expanded thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°c. below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures at which the related thermoformable material could be used in the process of the present invention. The reported Ta values were found, initially, by a trial-and-error technique in which a heated sheet of the thermoformable material (6 inches × 6 inches × 100 mils) was placed between continuous sheets of aluminum (6 inches × 6 inches × 100 mils) so as to ascertain, empirically, by trial-and-error, the minimum temperature at which the process of the present invention could be conducted. The reported Ta value was thus the minimum temperature at which the thermoformable material would adhere to the sheet of aluminium with sufficient force so that mechanical work applied to the molten thermoformable material, in the form of the pulling of the two sheets of aluminum apart, produced a viscous flow in the thermoformable material without loss of adhesion to the aluminum plates, as the plates were pulled apart to a height of at least twelve (12) times its original thickness.

These same minimum Ta values, as determined with aluminum mold plates, were also found to be the same (within about ± 1°-2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ± 1°-2°C. of the minimum Ta values which had been previously found for such materials in the initial trial-and-error procedures. These minimum Ta values were also within about ± 1°-2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion guide of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. In a process for expanding the cross section of a blank of thermoformable material by pulling said blank, while it is in a thermoformable state, between a pair of oppositely positioned mold plates, said blank having residual stresses and associated frozen-in-strains therein, in which the improvement comprises annealing said blank to remove said stresses and strains therefrom prior to said pulling step.

2. A process as in claim 1 in which said blank comprises thermoformable material selected from the group consisting of vinyl halide resin, vinylidene halide resin, polyurethane resin, polyarylene polyether resin, polycarbonate resin, nylon resin, cellulose acetate resin, polymethylmethacrylate resin, acrylonitrilebutadiene-styrene terpolymer resin, hydroxy propyl cellulose resin, styrene-acrylonitrile copolymer resin, and phenoxy resin.

3. A process as in claim 2 in which said thermoformable material comprises vinyl halide resin.

4. A process as in claim 3 in which said thermoformable material comprises vinyl chloride resin.

5. A process as in claim 2 in which said thermoformable material comprises polycarbonate resin.

6. A process as in claim 1 which further comprises drying said thermoformable material prior to the expansion thereof.

7. An improved process for expanding the cross section of a blank of thermoformable material, while said blank in a thermoformable state, with the attendant formation of one or more voids having a partial vacuum therein within said cross section wherein said blank has residual stresses and associated frozen-in-strains therein said expanding comprising venting said voids during the increasing of the cross section so as to equilibrate the lower level of pressure within said voids with the higher level of ambient pressure without said blank and thereby regulate the uniformity and integrity of the resulting cross-sectional geometry of the expanded blank, the improvement which comprises annealing said blank to remove said stresses and strains therefrom prior to said expanding step.

8. A process as in claim 7 in which the expansion of the cross section of the thermoformable material is accomplished by pulling the blank, while in said thermoformable state, between a pair of mold plates.

9. A process as in claim 8 in which said blank is adhesively bonded to said mold plates during said pulling.

10. A process as in claim 9 in which said blank is adhesively bonded to said mold plates as a result of hot tack adhesion between said blank and said mold plates.

11. A process as in claim 10 in which said blank comprises thermoplastic material.

12. A process as in claim 11 in which said thermoplastic material comprises synthetic resin.

13. A process as in claim 12 in which said synthetic resin comprises vinyl halide resin.

14. A process as in claim 13 in which said synthetic resin comprises vinyl chloride resin.

15. A process as in claim 12 in which said synthetic resin comprises polycarbonate resin.

16. A process as in claim 7 which further comprises drying said thermoformable material prior to the expansion thereof.

17. A process for expanding the cross section of a blank of thermoformable material having residual stresses and associated frozen-in-strains therein between a pair of perforation means, while said thermoformable material is in a thermoformable state, each of said perforation means providing perforations adjacent the interface of contact between said perforation means and said blank, and the perforations in one perforation means being non-aligned with the perforations in the other perforation means, said expanding being attended by the formation of one or more voids having a partial vacuum therein within the cross section of the expanding blank, the pattern of occurrence of such voids being in response to the pattern of perforations in said perforation means, which comprises annealing said thermoformable material prior to said expanding step, and venting said voids during said expanding so as to equilibrate the lower level of pressure within said voids with the higher level of ambient pressure without said blank and thereby regulate the uniformity and integrity of the resulting cross-sectional geometry of the expanded blank.

18. A process as in claim 17 in which the expansion of the cross section of the thermoformable material is accomplished by pulling the blank, while in said thermoformable state, between a pair of perforated mold plates as said perforation means.

19. A process as in claim 18 in which said blank is adhesively bonded to said mold plates during said pulling at the non-perforated areas of the perforated surfaces of the mold plates.

20. A process as in claim 19 in which said blank is adhesive bonded to said mold plates as a result of hot tack adhesion between said blank and the non-perforated surfaces of said mold plates.

21. A process as in claim 20 in which said blank comprises thermoplastic material.

22. A process as in claim 21 in which said thermoplastic material comprises synthetic resin.

23. A process as in claim 22 in which said synthetic resin comprises vinyl halide resin.

24. A process as in claim 23 in which said vinyl halide resin comprises vinyl chloride resin.

25. A process as in claim 21 in which said synthetic resin comprises polycarbonate resin.

26. A process as in claim 18 in which said pair of perforated mold plates are not aligned.

27. A process as in claim 18 further comprising the separation of at least one of said mold plates from the cooled expanded plastic.

28. A process as in claim 17 which further comprises drying said thermoformable material prior to the expansion thereof.

* * * * *

UNITED STATES PATENT OFFICE
CERTIFICATE OF CORRECTION

Patent No. 3,919,380           Dated November 11, 1975

Inventor(s) W. H. Smarook et al.

It is certified that error appears in the above-identified patent and that said Letters Patent are hereby corrected as shown below:

Column 1, line 52, "roatated" should read --rotated--.

Column 1, line 54, "moreover" should read --Moreover--.

Column 5, line 4, "memebers" should read --members--.

Column 7, in structure V, that portion of the structure reading

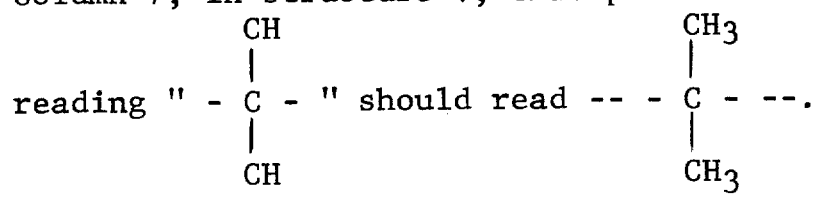

Column 8, pentultimate line, "benezene" should read --benzene--.

Column 9, line 10, "malbe" should read --mable--.

Column 9, line 29, "acids" should read --aids--.

Column 10, line 5, "polymethyme-" should read --polymethylme- --.

Column 11, line 31, "curing" should read --curring--.

Column 13, line 54, "of a the" should read --of the--.

Column 13, line 65, "a" should be deleted.

Column 15, line 36, "types" should read --types of--.

UNITED STATES PATENT OFFICE
CERTIFICATE OF CORRECTION

Patent No. 3,919,380        Dated November 11, 1975

Inventor(s) W. H. Smarook et al.

It is certified that error appears in the above-identified patent and that said Letters Patent are hereby corrected as shown below:

Column 17, line 22, "stop" should read --step--.

Column 18, line 42, "FIg." should read --FIG.--.

Column 22, line 17, "tone" should read --stone--.

Column 22, line 66, "of" should read --or--.

Column 23, line 15, "isocycnatopropyl" should read --isocyanatopropyl--.

Column 23, line 55, "snd" should read --and--.

Column 26, line 8, "voids" should read --void--.

Column 26, line 39, "c" should read --C--.

Column 27, line 61, "guide" should read --grade--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*